Figure 7:
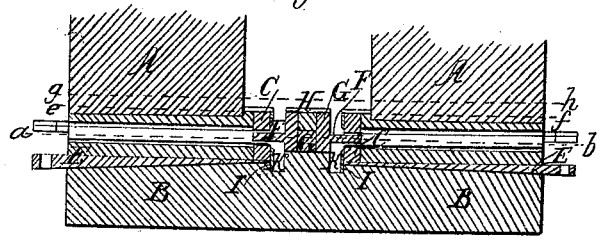

J. & C. Hanson.
Making Metallic Pipe.
N° 2,021.                    Patented Mar. 29, 1841.
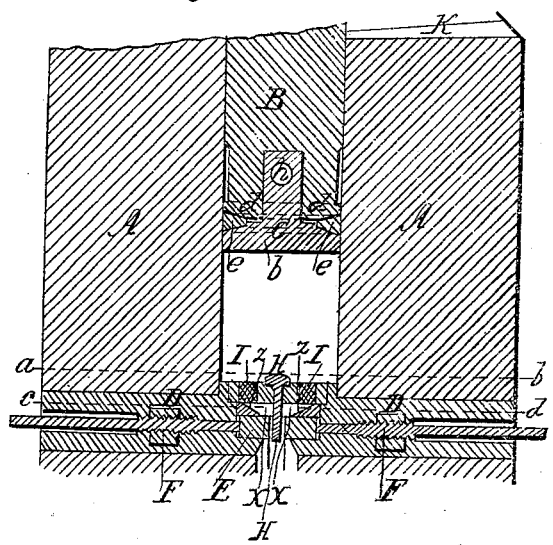
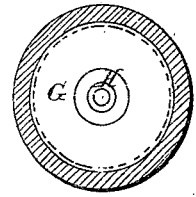
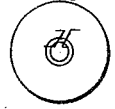
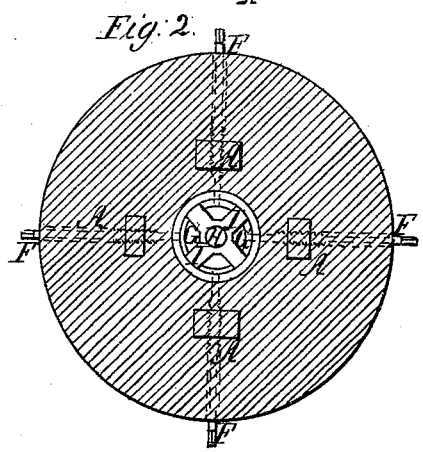
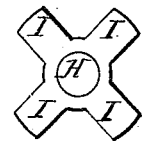
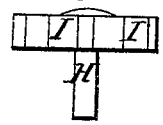
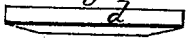
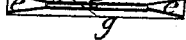
Witnesses;
Abr A Day
William North
Inventors;
John Hanson
Charles Hanson J. & C. Hanson.
Making Metallic Pipe.

N° 2,021.    Patented Mar. 29, 1841.

Sheet 2-3 Sheets.

Witnesses:
Abel Puy
William North

Inventors:
John Hanson
Charles Hanson

J. & C. Hanson.
Making Metallic Pipe.

N° 2,021.  Patented Mar. 29, 1841.

Witnesses;
Abt Pay
William North

Inventors;
John Hanson
Charles Hanson

Sheet 3-3 Sheets.

UNITED STATES PATENT OFFICE.

JOHN HANSON AND CHARLES HANSON, OF HUDDERSFIELD, ENGLAND, ASSIGNORS TO BEN. TATHAM, JR., AND HENRY B. TATHAM.

MACHINE FOR MAKING OR MANUFACTURING PIPES AND TUBES FROM LEAD OR OTHER METALLIC SUBSTANCES.

Specification forming part of Letters Patent No. 2,021, dated March 29, 1841; Reissued March 14, 1846, No. 82.

*To all whom it may concern:*

Be it known that we, JOHN HANSON, of Huddersfield, in the county of York, in England, leaden-pipe manufacturer, and CHARLES HANSON, of the same place, watchmaker, being respectively subjects of the Queen of Great Britain, have invented certain new and useful Improvements in Machinery or Apparatus for Making or Manufacturing Pipes and Tubes from Metallic Substances; and we, the said JOHN HANSON and CHARLES HANSON, do hereby declare that the nature of our said invention and the manner in which the same is to be performed are particularly described and ascertained in and by the following description thereof, reference being had to the drawings hereunto annexed, numbered, respectively, Sheet 1 and Sheet 2, and to the letters and figures marked thereon—that is to say:

Our invention of certain new and useful improvements in machinery or apparatus for making or manufacturing pipes and tubes from metallic substances applies to the machinery or apparatus for making or manufacturing pipes and tubes from lead or tin, or a mixture or compound of lead with other metals as tin or zinc or any other compound or alloy of soft metals, capable of being squeezed or forced by means of great pressure from out of a cylinder or receiver through or between apertures, dies and cores when in a solid state described and set forth in the specification of a patent granted to Thomas Burr of Shrewsbury in Shropshire in England aforesaid, dated the eleventh day of April one thousand eight hundred and twenty: [See London *Journal of Arts and Sciences* No. VI, for November A. D. 1820 page 411, de].

We construct our machinery as follows to wit:

1st. We in general use a short, fixed or stationary core for determining the inner diameter of the pipes or tubes, or the bore thereof: in contradistinction to the long movable core as described in the specification of the said Thomas Burr: which long core in his machinery or apparatus is attached to the piston of the cylinder as arranged by him, and is liable, in advancing with it, to warp and twist out of the straight line and out of center with the dies, from the difference of expansion and contraction of the metal under different degrees of temperature and from the extreme pressure required, and from other causes, which prevent or destroy the uniformity of the thickness and centrality of the bore of the pipes or tubes, and render that plan ineffective and ineligible.

2d. We use an improved mode of arranging and adjusting the dies or apertures which determine the outer diameter of the pipes or tubes, by which we are enabled easily and readily to bring the same central with the core when applying a fresh set of dies and cores to the cylinders in order to make pipes of different sizes, or at any time in case the same should get out of their relative true positions from any other cause.

3d. We employ a fixed guide piece, cross-bar, plate, holder or bridge placed near to the dies or apertures at the end of the cylinder, for the purpose of receiving and holding the short fixed or stationary core. We sometimes use a long movable core, attached to the piston, resembling that of Thomas Burr, and in this case we employ the fixed guide piece or bridge for the purpose of guiding and conducting the long movable core and keeping it central with the dies; the said movable core passing through the guide piece, cross-bar or bridge.

4th. The chamber (X Figures 1 and 21, on Sheet 1) situated between the bridge or holder, and the die, is formed of a conical shape, wide at the top and narrowing toward the die, for the purpose of constricting the metal around the core in its passage under pressure by the diminution of the aperture. This conical chamber is formed by a steel ring accurately fitted to the recess in the bottom of the cylinder, and is intended to rest upon the die, also to protect the adjusting screws by interposition, and to form a support to the cross bar, guide piece, plate, holder or bridge resting upon it.

5th. We use an improved construction of the piston adapted to the cylinder, by which the packing is forced outward against the inside of the cylinder by the pressure of the face or end of the piston against said packing, which will be better understood by referring to the drawings and description thereof hereinafter given.

6th. We reverse the arrangement of the cylinder and piston, by placing the piston above, and the cylinder below, instead of securing the cylinder to the top of the hydraulic press as in Thomas Burr's plan.

In our method, when a hydraulic press of the smaller kind is used in which the power of the ram is exerted from above, we should attach the piston to the ram, and cause it to be driven downward into the cylinder fixed stationarily to receive it. Very great force however being required we prefer a hydraulic press of the opposite construction, in which the ram is made to rise perpendicularly upward, and in this case we secure the piston to the top of the press, and place the cylinder beneath, upon the table or platform, with an aperture for the passage of the pipe, all resting upon the usual ram of the hydraulic press. Thus, when the ram ascends, the cylinder is made to rise and advance upon the stationary piston. (See Fig. 22, Sheet 2.) In connection with this reversed arrangement we feed the cylinder through an aperture in the upper end or side opposite to the dies, and directly under the piston when the die and piston are at the greatest distance apart (as shown at K, Fig. 19, Sheet No. 1 annexed). The said aperture is immediately closed as it passes the lower end of the piston. By this means the necessity of melting out the lead which clogs the dies after each operation, and of filling the cylinder through the dies themselves, or through apertures made for this purpose in the solid end of the cylinder, is obviated, such apertures being injurious to the strength in a part where strength is particularly wanted, and said openings requiring, when so used, to be stopped by means of plugs or screws. By this reversed arrangement also, great facility in working the machinery is obtained. Oil or other lubricating materials may be easily applied to the dies and cores, or other parts situated at the bottom of the cylinder, previous to pouring in a fresh charge of metal; and further, the pipes, (instead of being forced upward, and being received above the top of the hydraulic press, as in Thomas Burr's method) are caused to issue downward, and may be immediately wound upon reels or may be received in a long descending cooling trough without requiring to be handled while warm and liable to injury.

Lastly we arrange, combine and adapt our improved parts or mechanism so as to make two, three or more lengths of pipes or tubes at one and the same time and operation; and for this purpose we provide two or more apertures furnished with the requisite apparatus for the formation of the pipes, each substantially resembling and constructed in the same manner with that described for forming a single pipe.

All these improvements will be better understood by referring to the accompanying drawings which are sectional, and detached views of the cylinder and various parts to which we shall now refer.

Fig. 1, Sheet 1, is a vertical section of the lower portion of a cylinder with the piston shown therein, and also our improved construction and adaptation of a short core with the die applied thereto. Fig. 2, is a horizontal section of the cylinder taken on the line $a$, $b$, in Fig. 1, or just above the cross bar or bridge piece, core and die. Fig. 3, is another similar partial section of the same taken on the line $c$, $d$, in Fig. 1, or just below the cross bar, for the purpose of showing the die more clearly. Fig. 4 is a plan view of the die detached showing the situation of the core within the aperture. Fig. 5 is a detached side view of the short fixed core and its cross bar or bridge, and Fig. 6 is a plan view of the same.

A, A, Fig. 1, is a portion of the cylinder; B, the piston rod or plunger, which is fixed or stationary in the head of the strong frame work of the apparatus. C is the piston attached to the plunger or rod, the various parts or details of which are shown separate at Figs. 13 to 18 inclusive, and will be described hereafter. D is the lower end or bottom of the cylinder firmly attached thereto by bolts, and also to a strong hollow pillar, table or platform placed on the top of the usual ram of the hydraulic press. E is the die, which is fitted into the bottom of the cylinder in a recess or cup, as shown in the drawings. F, F, are adjusting screws for setting, or regulating the situation of the die as regards the core.

Figure 19:
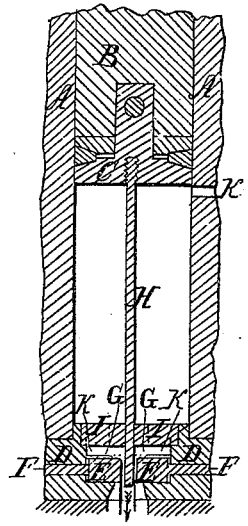
Figure 20:
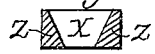
Figure 21:
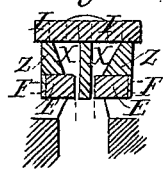

G, Fig. 19, and Figs. 2 and 3, is a thin steel plate fitted very accurately into a cup or recess in the bottom of the cylinder for the purpose of preventing the lead or other set metal from being driven between the edges of the die and the recess or to the adjusting screws, the threads of which would otherwise become clogged. It is exhibited in several of the drawings. But as a substitute for the steel plate G, we prefer to employ the steel ring Z, which forms the conical chamber, and is employed and exhibited in Figs. 1 and 20. Sheet 1. The diameter of the aperture through the steel ring Z is greatest at the edge or side next to the bridge or holder, and diminishing downward it is smallest at the end next to the dies. The aperture being thus of the form of an inverted cone. Fig. 20 is a view of a section of the steel ring Z. Fig. 21, is a sectional representation (on another scale) of the conical chamber X, formed by the steel ring Z, with the die E below, and the bridge I above it. When fitted in their places in the bottom of the cylinder, as exhibited in Figs. 1 and 21, the steel ring rests upon the die E, protects the adjusting screws F, F, by interposition, and forms a support for the cross bar, bridge or holder I. The steel ring Z, forming the conical chamber has the advantage over the steel plate G, of constructing the metal in its passage, under pressure, and of diminishing the friction.

In Figs. 1, 2, 5, 6, 19 and 21, the bridge or holder is shown by the letter I, and the short fixed core is represented by the letter H, where used.

Figure 10:
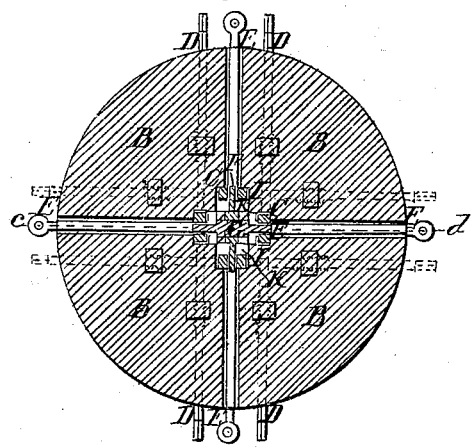
Figure 11:
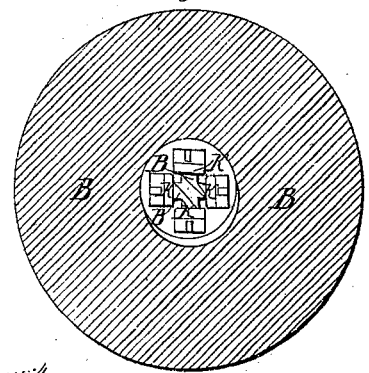
Figure 12:
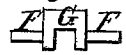
Figure 8:
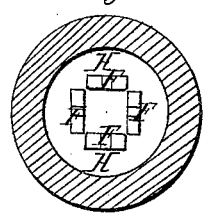
Figure 9:
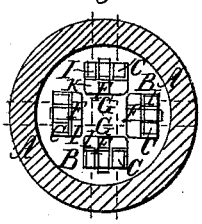

K, Fig. 1, and Fig. 19, show the situation of the aperture or opening in the upper part of the cylinder, or side or end opposite to the dies, through which the cylinder is filled with melted metal, and which is immediately closed by the passage of the piston end. Fig. 7, Sheet 2, is another vertical section of the lower part of a cylinder, showing a novel arrangement combination and adaptation of our improved mechanism for making four different lengths of pipes at one and the same time. Fig. 8 is a partial sectional plan view of the same, taken in the line $g$, $h$, in Fig. 7. Fig. 9 is a horizontal section or plan view taken at the line $e$, $f$, the plate H being removed. Fig. 10 is another horizontal section taken through the dies and cores in the line $a$, $b$, in Fig. 7. Fig. 11, is a plan view of the bottom of the cylinder, the dies and cores being removed to show its construction. Fig. 12 is a side view of one of the cores detached. A, A, is the cylinder; B, B, the bottom of the same; C, C, are the dies the cores and apertures of which are in this instance placed in a horizontal position. D, D, are the screws for properly adjusting the horizontal situation of the dies as regards the cores or mandrels and E, E, are wedges for adjusting the vertical position of the dies to the cores. F, F, are the cores or mandrels fixed into a forming part of stocks or pieces of metal, G, G, which are mortised into one another, and also into the bottom of the cylinder as shown in the drawings and thereby securely retained in their proper situation. The arrows indicate the course of the metal as it passes out of the cylinder in the form of tubes or pipes which is shown by a red tint as in the former figures. H is the thin steel plate (here used instead of the steel ring) having four apertures formed in it corresponding with the wells and recesses formed in the bottom of the cylinder, which steel plate is placed on the top of the dies to prevent the access of set metal to the adjusting screws, and I, I, are other plates placed in front of the dies for the same purpose and to prevent its access to the wedges. The bottom of the cylinder has four wells or recesses K, K, formed in it as shown more particularly in Fig. 11, to allow of the passage of the set metal to the different dies and cores.

Figure 13:
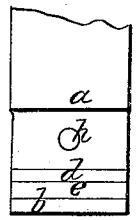
Figure 14:
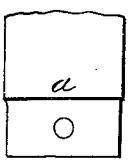
Figure 17:
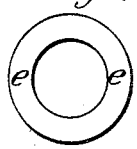
Figure 16:
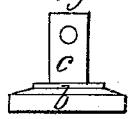

Fig. 13, Sheet 1, is a representation of the end of the piston rod, shown detached from the cylinder with our improved construction of piston attached thereto. Fig. 14 is a similar representation with the parts of the piston detached, which are shown separate at Figs. 15, 16, 17 and 18. $a$ is the piston rod; $b$ is the lower end or butt of the piston attached to the rod by the pin $c$; $d$ is the upper part of the piston. Between the inclined or conical shaped sides of the parts $d$ and $b$ is placed the ring $e$; shown detached in plan at Fig. 17, and in section at Fig. 18, the sides of this ring are also inclined or conical shaped, and it is cut or severed by means of a saw in the direction shown by the line $f$, $g$, in Fig. 18, and consequently it will be obliged to expand and keep the piston tightly packed with the cylinder under great pressure and thereby prevent the escape of metal past the piston. The piston is attached to its rod $a$ by means of a pin $h$ passed through it, and the pin $c$, or in any other convenient manner.

Fig. 19 is a vertical section of a cylinder and piston, showing our last improvement applied thereto, (viz.) the application and adaptation of the guide piece, or cross bar, plate or bridge, through which the long core or mandrel attached to the piston passes, for the purpose of keeping it central with the die. A, A, is the cylinder. B, the piston rod. C the piston. D the bottom of the cylinder. E the die. G the thin steel plate, (here exhibited instead of the steel ring that in Figs. 1 and 21 form the conical chamber.) F, the adjusting screws. H, the long core attached to the piston C and traveling with it passing freely through the guide piece, cross bar or bridge I, I, which has a properly shaped hole bored through it for this purpose consequently keeping the core at all times steady and central with the die. K is the aperture for supplying the cylinder with melted metal.

Figure 22:
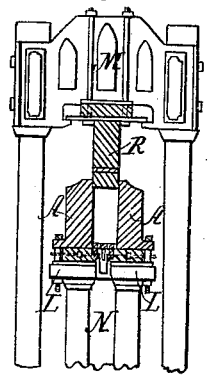

Fig. 22, Sheet 2 exhibits the reversed arrangement of the cylinder A, and the piston B. L is the table. M the top of the hydraulic press. N shows the situation of the ram.

The operation of making or manufacturing pipes or tubes is as follows: After a die, steel ring, or plate bridge, and core of the required diameter have been applied to the bottom of the cylinder and properly adjusted, the cylinder and other parts being lowered, a charge of lead or other metal in a fluid state is admitted through the aperture (K, Fig. 19 and Fig. 1) at the side or end of the cylinder opposite to the dies and immediately under the piston. And as soon as this metal is "set" or becomes hard and solid, and before it becomes cold, the power of the hydraulic press is set in action, and as the ram, hollow pillar, table, cylinder with its appurtenances rise upward, the feeding aperture is first closed by the stationary piston, and when this is effected the metal is forced in the direction of the arrows in Fig. 1, between the arms or apertures of the cross bar, guide piece, bridge or holder I, through the conical chamber X and through the aperture between the die and the core below it, being forced by the extreme pressure and constriction to reunite perfectly around the core in its passage, and leaving the machinery in the form of pipes or tubes. The pipe may be received in a long descending cooling trough or may be immediately wound upon reels, as fast as it is discharged from the machinery.

The set metal is represented in the drawings by a tint of red color. And we would here remark that we wish it to be understood that we do not intend to confine ourselves to the mode of operation herein described by making the cylinder rise with the hydraulic ram and other parts, and keeping the piston stationary, as the same operations and effects will take place, when the cylinder is fixed or stationary, and the power of the hydraulic ram applied to the top of the piston rod to cause it to descend into the cylinder. Nor do we confine ourselves to making the cross bar or bridge which holds or guides either the short or the long core, with four arms only, since it might be made of various constructions, with one, two or three or more arms; or it might be a circular plate with holes through it; or it might be constructed as a projection from the side, or from the bottom of the cylinder with one large aperture nearly surrounding it, and thus it might hold the core in a horizontal direction if desired, so as to discharge the pipes laterally or otherwise. All which and other variations will readily suggest themselves to any practical engineer without departing from the substantial originality of our invention, the main feature of which is, that soft metals when in a "set" or solid state can be made, by extreme pressure, to reunite perfectly around a core, after a separation, and thus be formed into solid, compact and strong pipes or tubes.

We may here remark that it might be supposed that the "set" or solid metal being divided in its descent by the several arms of the cross piece or bridge I into separate portions, would not reunite again at the point of entering the space between the die and the core, but our full and successful experience proves the contrary. The metal leaves our improved apparatus in the shape of tubes of perfect solidity and unusual strength. By this process a fine uniformity of thickness and accuracy of bore is arrived at, such as (it is believed) has never before been accomplished by any other machinery.

Having now particularly described the nature of our improvements and the manner of carrying the same into effect, we would here remark that we do not mean or intend to claim any of the parts of the cylinder, plunger or piston rod, or the manner of fitting them up nor the mode or method of connecting them to one another, as none of these are new and they may be varied and fitted up in different ways to suit different arrangements of machinery.

What we claim as our invention and desire to secure by Letters Patent are:

1. The manner set forth of making pipes or tubes of lead or other suitable metals by pressing or driving with great force the metal while warm, though not fluid, but in a "set" or solid state through the apertures, arms or divisions of the holder or bridge I, and so causing the metal to reunite around the core under the pressure after passing the bridge.

2. The plan of feeding the cylinder through the aperture in the upper end, or side of the cylinder opposite to the dies and closing the aperture by the entry of the piston, in combination with the reversed arrangement of the cylinder and piston as particularly set forth, for the advantage of discharging the pipes downward and for other important facilities and purposes described.

3. The conical form of the chamber between the bridge and the dies, by which the metal is constricted in its passage under the pressure.

4. The combination of the guide piece I, with the long movable core attached to the piston, in the manner and for the purposes described.

5. The adaptation of the improved parts by which several lengths of pipe may be made at one and the same time and operation.

6. The mode of constructing the piston by which the packing is forced outward against the inside of the cylinder by the pressure of the face or end of the piston against said packing as described.

In witness whereof we the said JOHN HANSON and CHARLES HANSON have hereunto set our hands this twenty-fifth day of January, A. D. one thousand eight hundred and forty-one.

JOHN HANSON.
CHAS. HANSON.

Witnesses:
   EDW. LAKE HESP,
   JOHN DOUGELL.